United States Patent
Beller et al.

(10) Patent No.: US 10,546,063 B2
(45) Date of Patent: Jan. 28, 2020

(54) PROCESSING OF STRING INPUTS UTILIZING MACHINE LEARNING

(71) Applicant: International Business Machines Corporation, Armonk, NY (US)

(72) Inventors: Charles E. Beller, Baltimore, MD (US); Chengmin Ding, Chantilly, VA (US); Allen Ginsberg, St. Petersburg, FL (US); Elinna Shek, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 15/376,942

(22) Filed: Dec. 13, 2016

(65) Prior Publication Data

US 2018/0232357 A1    Aug. 16, 2018

(51) Int. Cl.
*G06F 17/27* (2006.01)
*G06F 17/24* (2006.01)

(52) U.S. Cl.
CPC .......... *G06F 17/2775* (2013.01); *G06F 17/24* (2013.01); *G06F 17/274* (2013.01); *G06F 17/277* (2013.01)

(58) Field of Classification Search
None
See application file for complete search history.

(56) References Cited

U.S. PATENT DOCUMENTS

| 5,740,318 A * | 4/1998 | Naito ............... G10L 25/87 704/248 |
|---|---|---|
| 8,131,546 B1 | 3/2012 | Zoellner |
| 8,370,328 B2 | 2/2013 | Woytowitz et al. |
| 8,370,361 B2 | 2/2013 | Topham et al. |
| 8,447,604 B1 * | 5/2013 | Chang ............... H04N 9/475 434/185 |
| 9,286,892 B2 | 3/2016 | Mengibar et al. |
| 9,342,588 B2 | 5/2016 | Balchandran et al. |
| 9,424,245 B2 | 8/2016 | Kassis et al. |
| 2007/0192309 A1 | 8/2007 | Fischer et al. |

(Continued)

OTHER PUBLICATIONS

Micsinai, 3 Key Capabilities Necessary for Text Analytics & Natural Language Processing in the Era of Big Data, Nov. 4, 2014, pp. 1-7.

(Continued)

*Primary Examiner* — Neeraj Sharma
(74) *Attorney, Agent, or Firm* — Lieberman & Brandsdorfer, LLC

(57) ABSTRACT

Natural language processing of raw text data for optimal sentence boundary placement. Raw text is extracted from a document and subject to cleaning. The extracted raw text is examined to identify preliminary sentence boundaries, which are used to identify potential sentences in the raw text. One or more potential sentences are assigned a well-formedness score. A value of the score correlates to whether the potential sentence is a truncated/ill-formed sentence or a well-formed sentence. One or more preliminary sentence boundaries are optimized depending on the value of the score of the potential sentence(s). Accordingly, the processing herein is an optimization that creates a sentence boundary optimized output.

12 Claims, 10 Drawing Sheets

(56) References Cited

U.S. PATENT DOCUMENTS

| | | | |
|---|---|---|---|
| 2007/0260449 A1* | 11/2007 | Pan | G06F 17/277 |
| | | | 704/9 |
| 2008/0015842 A1 | 1/2008 | Moore | |
| 2008/0133245 A1 | 6/2008 | Proulx et al. | |
| 2011/0301941 A1 | 12/2011 | De Vocht | |
| 2015/0032738 A1 | 1/2015 | Nachnani et al. | |
| 2015/0348541 A1 | 12/2015 | Epstein et al. | |
| 2016/0026258 A1* | 1/2016 | Ou | G06F 17/276 |
| | | | 715/773 |
| 2016/0070693 A1 | 3/2016 | Carrier et al. | |
| 2016/0335255 A1* | 11/2016 | Alhamed | G06F 17/2863 |
| 2017/0228360 A1* | 8/2017 | Egi | G06F 17/2735 |
| 2017/0286408 A1* | 10/2017 | Yanai | G06F 17/21 |
| 2017/0357633 A1* | 12/2017 | Wang | G06F 17/276 |
| 2018/0113873 A1* | 4/2018 | Gulwani | G06F 16/90344 |
| 2018/0137170 A1* | 5/2018 | Hill | G06F 16/24545 |

OTHER PUBLICATIONS

Nuance Communications Inc., Omnipage Ultimate User's Guide, copyright 2013, pp. 1-94.
Apache Opennlp Development Community, Apache OpenNLP Developer Documentation, The Apache Software Foundation, Jan. 2004, pp. 1-8, Version 2.0.
List of IBM Patents or Applications Treated as Related, Dec. 2016.

\* cited by examiner

PROCESSING OF STRING INPUTS UTILIZING MACHINE LEARNING

GOVERNMENT INTEREST

Certain embodiments were made with Government support under Contract No. 2013-12101100008 awarded by United States of America, Department of Defense. The Government has certain rights in the invention.

BACKGROUND

The present embodiments relate to natural language processing of raw text data. More specifically, the embodiments relate to optimal sentence boundary placement.

Natural language processing (NLP) systems are used to extract information from documents intended to be read by a human audience in order to enable computers to understand content of the document. NLP systems extract information from the documents to provide a complete and accurate representation of the original content. The extracted information can be provided to other computer systems in a plain text output (e.g. raw text data). The plain text output can be used by a classifier to determine the meaning of the text to support other computer systems and trigger programmatic function corresponding to the meaning.

Documents such as reports, newspapers, and magazines use stylistic devices, such as paragraph headers, address formatting, lists, and tables in order to provide content expression that facilitates organization and understanding of the content. However, such stylistic devices can be difficult to translate to a plain text format output for use by a computing system, leading to extraneous information in the translation. The stylistic devices can lead to plain text outputs containing distorted text, which may effectively limit performance of downstream NLP.

SUMMARY

A system, computer program product, and method are provided to optimize sentence boundary placement.

In one aspect, a system is provided with a processing unit in communication with a memory, and a functional unit in communication with the processing unit. The functional unit has tools for natural language processing. The tools determine optimal sentence boundary placement in a received string input. More specifically, the tools identify two or more preliminary sentence boundaries within the input which are utilize to identify two or more potential sentences within the input. The tools assign a first score to each potential sentence. The assigned first score corresponds to a probability of the potential sentence being an actual sentence. Based on a relationship to the assigned first score, the tools selectively compare each identified potential sentence to a first potential sentence in a first category and a second potential sentence in a second category. The comparison is utilized to selectively categorize each compared potential sentence into one of the first or second categories. The tools transform the input into a sentence optimized output including modifying a potential sentence with the input, categorization, and a preliminary sentence boundary.

In another aspect, a computer program product is provided for natural language processing. The computer program product includes a computer readable storage medium with embodied program code that is configured to be executed by a processing unit. More specifically, program code identifies two or more preliminary sentence boundaries within the input which are utilize to identify two or more potential sentences within the input. Program code assigns a first score to each potential sentence. The assigned first score corresponds to a probability of the potential sentence being an actual sentence. Based on a relationship to the assigned first score, program code selectively compares each identified potential sentence to a first potential sentence in a first category and a second potential sentence in a second category. The comparison is utilized to selectively categorize each compared potential sentence into one of the first or second categories. Program code transforms the input into a sentence optimized output including modifying a potential sentence with the input, categorization, and a preliminary sentence boundary.

In yet another aspect, a method is provided for natural language processing. Optimal sentence boundary placement in a received string input is determined. More specifically, two or more preliminary sentence boundaries within the input are identified which are utilize to identify two or more potential sentences within the input. A first score is assigned to each potential sentence. The assigned first score corresponds to a probability of the potential sentence being an actual sentence. Based on a relationship to the assigned first score, each identified potential sentence is selectively compared to a first potential sentence in a first category and a second potential sentence in a second category. The comparison is utilized to selectively categorize each compared potential sentence into one of the first or second categories. The input is transformed into a sentence optimized output including modifying a potential sentence with the input, categorization, and a preliminary sentence boundary.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A natural language processing (NLP) system, as described herein, processes raw text data into an optimized sentence boundary output. The NLP system is incorporated between the raw text data input and downstream processing that relies on sentence boundary placement. Raw text data is received as input and processed to create an optimized sentence boundary output from the input. The optimized sentence boundary output delineates grammatical boundaries within the raw text, thereby increasing accuracy of downstream NLP processing, including the derived meaning of the raw text data. In one embodiment, the optimized sentence boundary output is a file.

Figure 1:
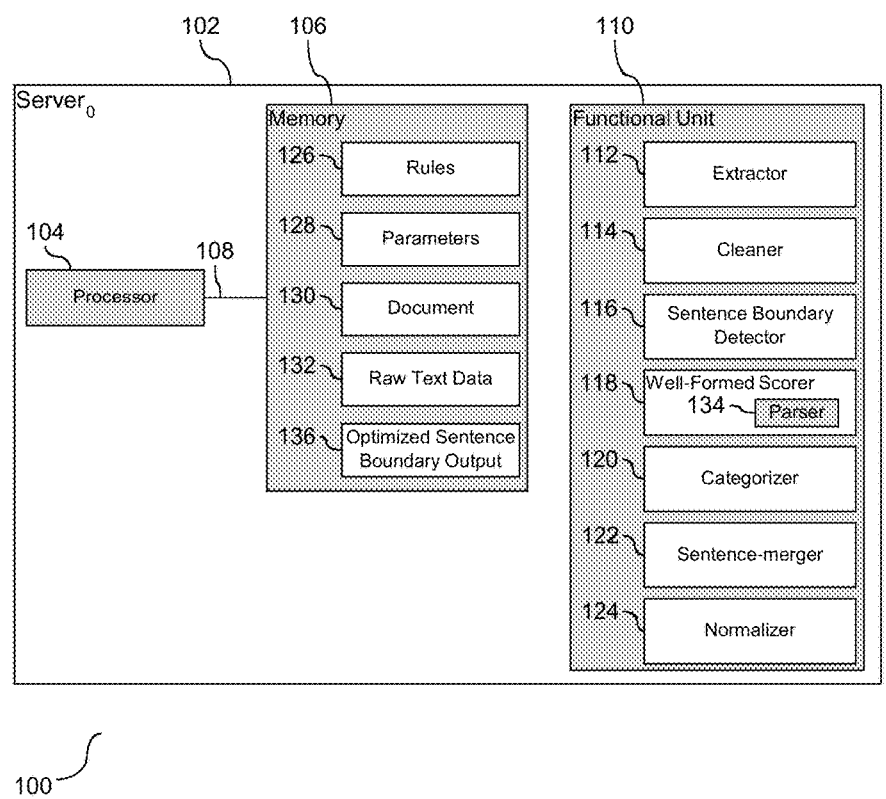
FIG. 1 depicts a block diagram illustrating a computer system that supports and enables optimal sentence boundary placement.

Referring to FIG. 1, a block diagram (100) is provided illustrating a computer system that supports and enables optimal sentence boundary placement. As shown, a server, server$_0$, (102) is configured with a processing unit (104) in communication with a memory (106) across a bus (108). Memory (106) is embedded with rules (126) and parameters (128) to support a functional unit (110). As shown, the functional unit (110) is embedded in the server, server$_0$ (102) and is in communication with the processing unit (104). The functional unit (110) contains tools to support optimal sentence boundary placement, including but not limited to, an extractor (112), a cleaner (114), a sentence boundary detector (116), a well-formedness scorer (118), a categorizer (120), a sentence-merger (122), and a normalizer (124). Accordingly, the embedded tools support the functionality associated with sentence boundary placement.

Each of the tools embedded in the functional unit (110) contribute to aspects of the sentence boundary placement, as are described below. The extractor (112) extracts raw text data from a document (130) stored in memory (106) or in one embodiment, local persistent storage (not show), or in one embodiment remote persistent storage (not shown). The document is a file that is configured in a format. Examples of such formats include, but are not limited to, pdf, image, such as JPG or TIFF, word processing format, HTML file, or other document types. The raw text data may include string data and non-string data, or a combination of string and non-string data. In one embodiment, the extractor (112) stores the extracted raw text data (132) in memory (106). In one embodiment, the extracted raw text data is stored as a plain text file. Accordingly, the extractor (112) extracts raw text data from the document (130) and stores the extracted raw text data (132) in memory (106).

The cleaner (114) functions to perform a cleaning of the raw text data (132) stored in memory (106). Examples of cleaning include language identification, character encoding detection, and special character spill detection. More specifically, the cleaner (114) transforms the raw text data (132) into a cleaned raw text data (132). Accordingly, the cleaner (114) processes the raw text data (132) in order to prepare the raw text data file for sentence boundary detection.

An inspection of the cleaned raw text data (132) is conducted by the sentence boundary detector (116), and one or more preliminary sentence boundaries are determined from the inspection. In one embodiment, the sentence boundaries are determined based on one or more rules (126). For example, the rules (126) may identify or define a character or data which denotes a sentence conclusion or introduction. In one embodiment, preliminary sentence boundaries include sentence punctuation such as, but not limited to, ".", ",", "?", "!", ";", ":", "¡", and "¿". The sentence boundary detector (116) identifies any preliminary sentence boundaries in the cleaned raw text data (132), and thereby identifies portions of data which are potential sentences based on the preliminary sentence boundary. The potential sentences may be sentence fragments. Accordingly, the sentence boundary detector (116) modifies the raw text data (132) to indicate preliminary sentence boundary placement, and thereby identify potential sentences within the raw text data (132) based on the preliminary sentence boundary placement.

As described with respect to the sentence boundary detector (116), the identification is preliminary, and as such, not final. The well-formedness scorer (118) inspects the raw text data (132), generates a well-formedness (WF) score for each potential sentence and assigns the WF score to each potential sentence. WF scores are generated with respect to ill-formed and well-formed sentences. In one embodiment, the WF score is assigned based on one or more rules (126). Each WF score has a specified value, with the value reflecting ill-formed and well-formed sentences. For example, in one embodiment, the score value within a first range of score values is indicative of a truncated or ill-formed sentence and the score value within a second range of score values is indicative that the potential sentence is a well-formed sentence. It is understood that a well-formed sentence as extracted from the raw text data would be understood or interpreted accurately by downstream NLP. Accordingly, the well-formedness scorer generates and assigns scores for each potential sentence.

As shown, a parser (134) can be embedded into or associated with the well-formedness scorer (118). The parser (134) functions to determine a confidence score for the potential sentence. The confidence score may be determined from the perplexity of aspects present in the potential sentence, including, but not limited to, parts of speech, word, lemma, and character sequence, as compared to a language model. Similarly, a confidence score may be determined from the edit distance, Levenshtein distance, Jaro Winkler distance, with the distance(s) measured between the part of speech, word, lemma, and character sequence of the potential sentence and the part of speech, word, lemma, and character sequence of a well-formed sentence. The parser (134) communicates the confidence score to the well-formedness scorer (118). The well-formedness scorer (118) uses the confidence score in the generation of the WF score. In one embodiment, the well-formedness scorer (118) assigns a WF score by modifying the raw text data (132) to scored raw text data (132) by changing content of the data.

Accordingly, the well-formedness scorer (118) assigns a WF score to potential sentences reflecting a probability that the text being processed is a well-formed sentence.

A category is assigned to each sentence processed from the raw file, with the category reflecting construction of the possible sentence structure. As shown, the categorizer (120) inspects the assigned WF scores of the potential sentences in the raw text data (132), and assigns a category to each potential sentence. The category may be, but is not limited to, well-formed prose (WFP), ill-formed prose (IFP), semi-structured entity construct (SSEC), and a user defined category. In one embodiment, the SSEC is a block of data (e.g. text) whose formatting indicates presence of meaningful content. In one embodiment, the formatting may indicate the text in the processed file was derived from a table, an address block, a delineated list, an image, and/or a figure. Ill-formed prose (IFP) is a block of text that is a non-sentential text fragment that does not follow the rules of grammar or usage as accepted by a rule. In one embodiment, the definition of the category and the procedure to assign the category to a potential sentence is stored in rules (126). In one embodiment, the categorizer (120) assigns the category by modifying the raw text data (132) to categorized raw text data (132) by changing the content of the data. Accordingly, the categorizer assigns one or more categories to each potential sentence, with the assignment utilizing the assigned WF score.

The sentence merger (122) inspects the potential sentences in the raw text data (132) and modifies the raw text data file (132) by merging one or more potential sentences together based on the assigned WF score and in one embodiment, the assigned category of the potential sentence. In one embodiment, the sentence merger (122) is limited to a merge operation on sentences assigned to the category IFP. During the merge operation, the sentence merger (122) removes one or more preliminary sentence boundaries that are present or have been identified between a potential sentence with an assigned WF score in the first range, e.g. low score value, and at least one adjacent potential sentence. The adjacent potential sentence can by any potential sentence identified by the sentence boundary detector (116). The sentence merger (122) thereby creates a single new potential sentence having the content of the potential sentences. Accordingly, the raw text data file is modified to create a new potential sentences utilizing at least one potential sentence with a WF score in the first range of score values and one or more adjacently positioned sentences.

The normalizer (124) inspects the raw text data (132) and formats potential sentences based on the assigned WF score and in one embodiment, the assigned category. In one embodiment, the normalizer (124) is limited to formatting sentences assigned with the SSEC category. The formatting includes removing preliminary sentence boundaries between consecutive identified potential sentences and creating a formatted potential sentence block. In one embodiment, the formatted potential sentence block separates the identified potential sentences within the potential sentence block with grammatical element, such as, but not limited to, commas, tabs semi-colons, colons, etc. SSECs sent through a parser lead to errors and non-legible output. Identification and normalization of the SSECs enables downstream parsers, which rely on sentence boundary placement, to effectively manage a table and address block present in the raw text file. Examples of effective management may include providing responses to the raw text data and limiting processing time required. The normalizer (124) effectively transforms the raw text data (132) into an optimized sentence boundary output (136) utilizing the formatted potential sentence block, potential sentences, and preliminary sentence boundaries. In one embodiment, the optimized sentence boundary output is a file which may be stored in memory (106) or secondary memory (not shown). Accordingly, the optimized sentence boundary file indicates where sentences are or may be located in the raw text data, including the sentence boundaries based on the optimal sentence boundary placement performed by the sentence-merger (122) and the normalizer (124).

Figure 2:
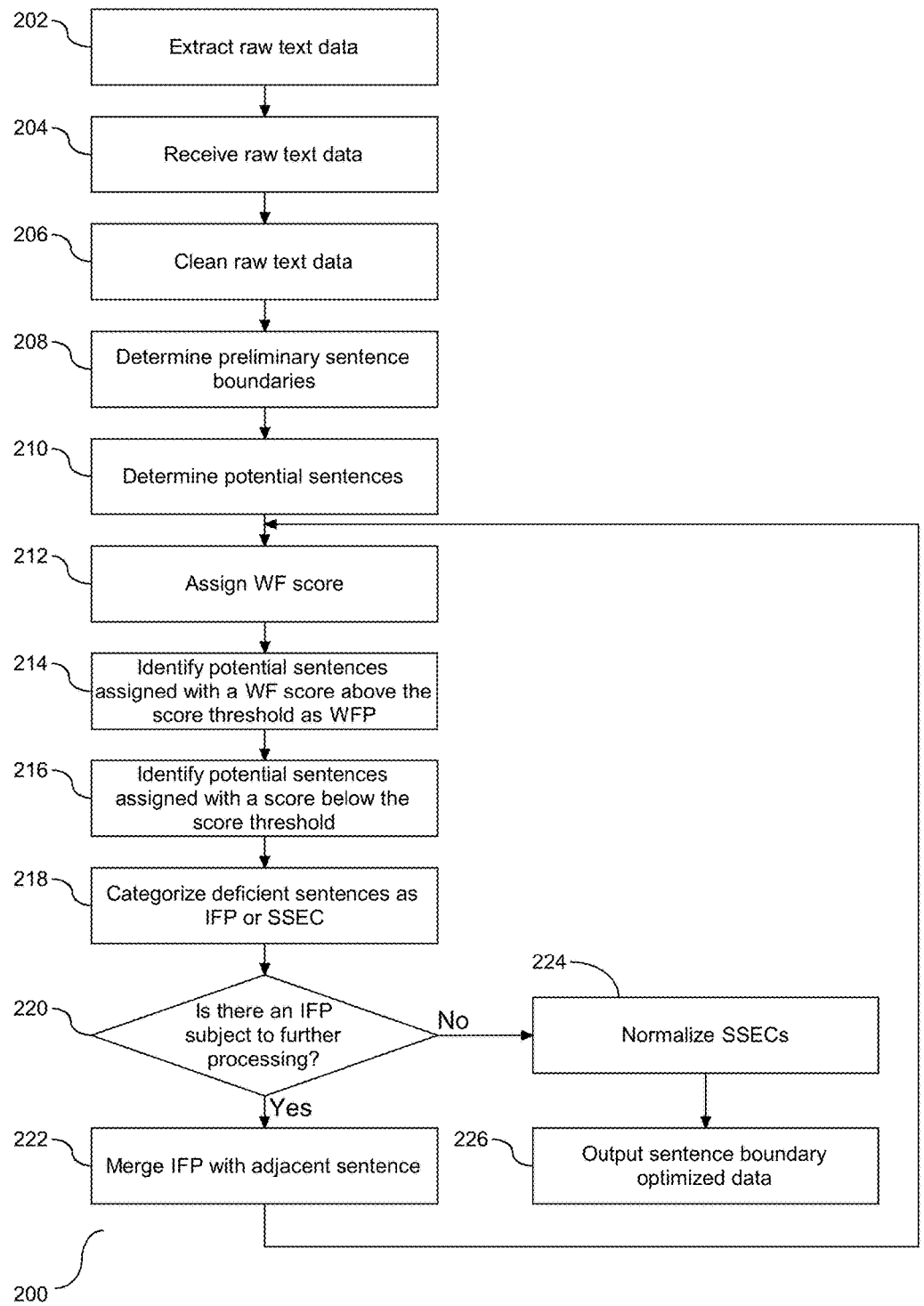
FIG. 2 depicts a flow chart illustrating a method to determine optimal sentence boundaries.
Figure 3A:
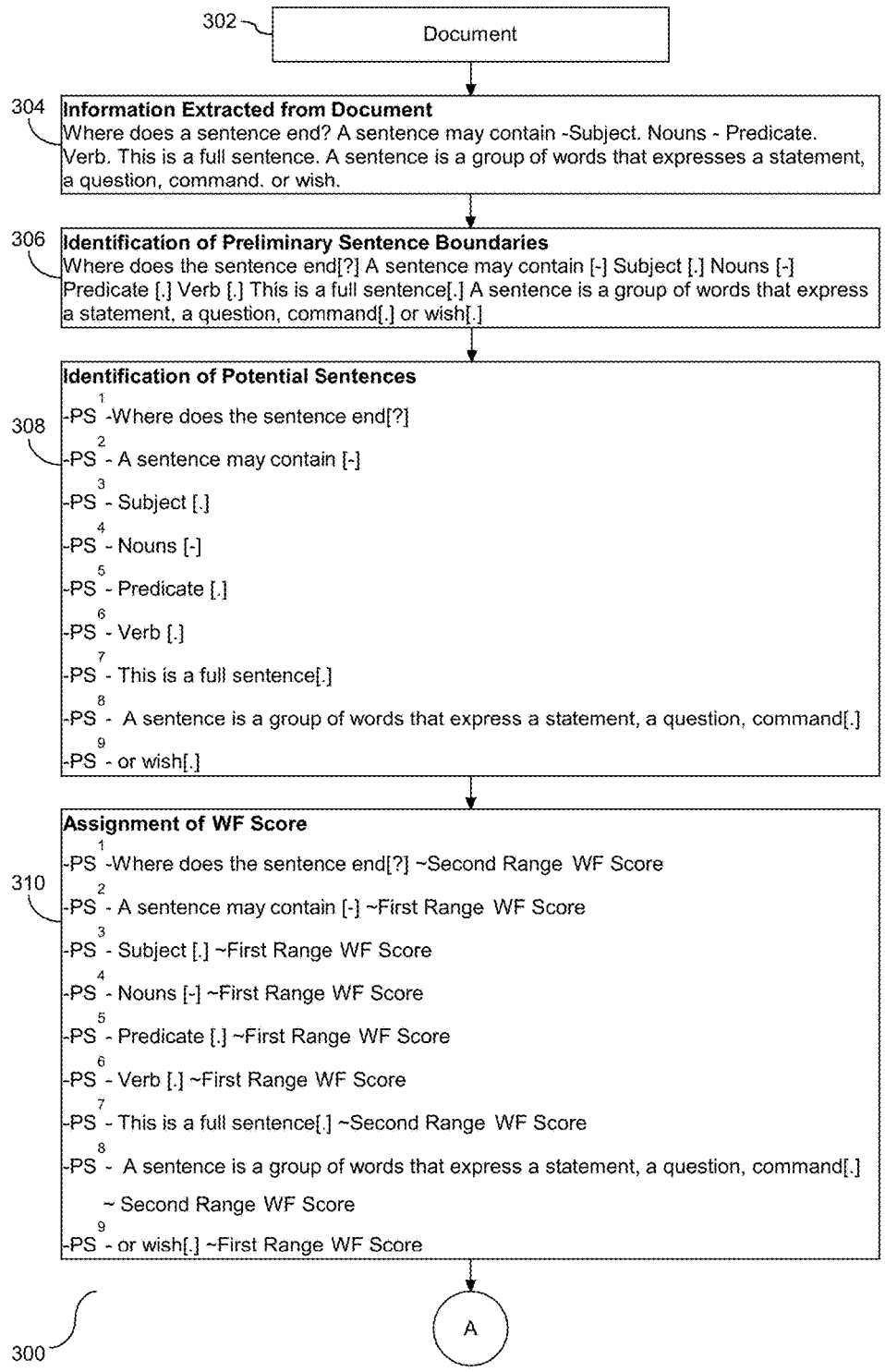
FIGS. 3A-E depicts a flow chart illustrating creation of a sentence boundary optimized file.
Figure 3B:
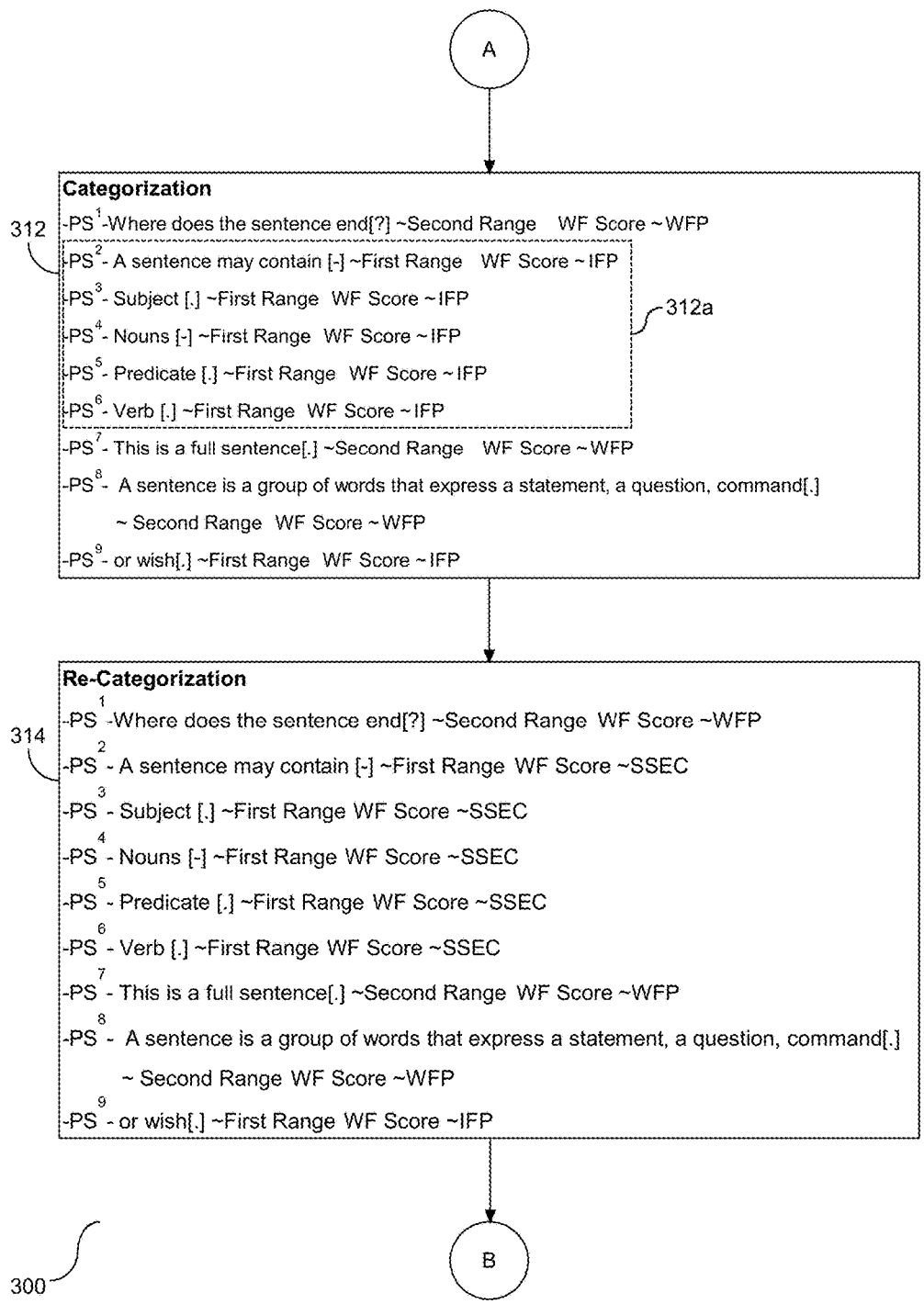
Figure 3C:
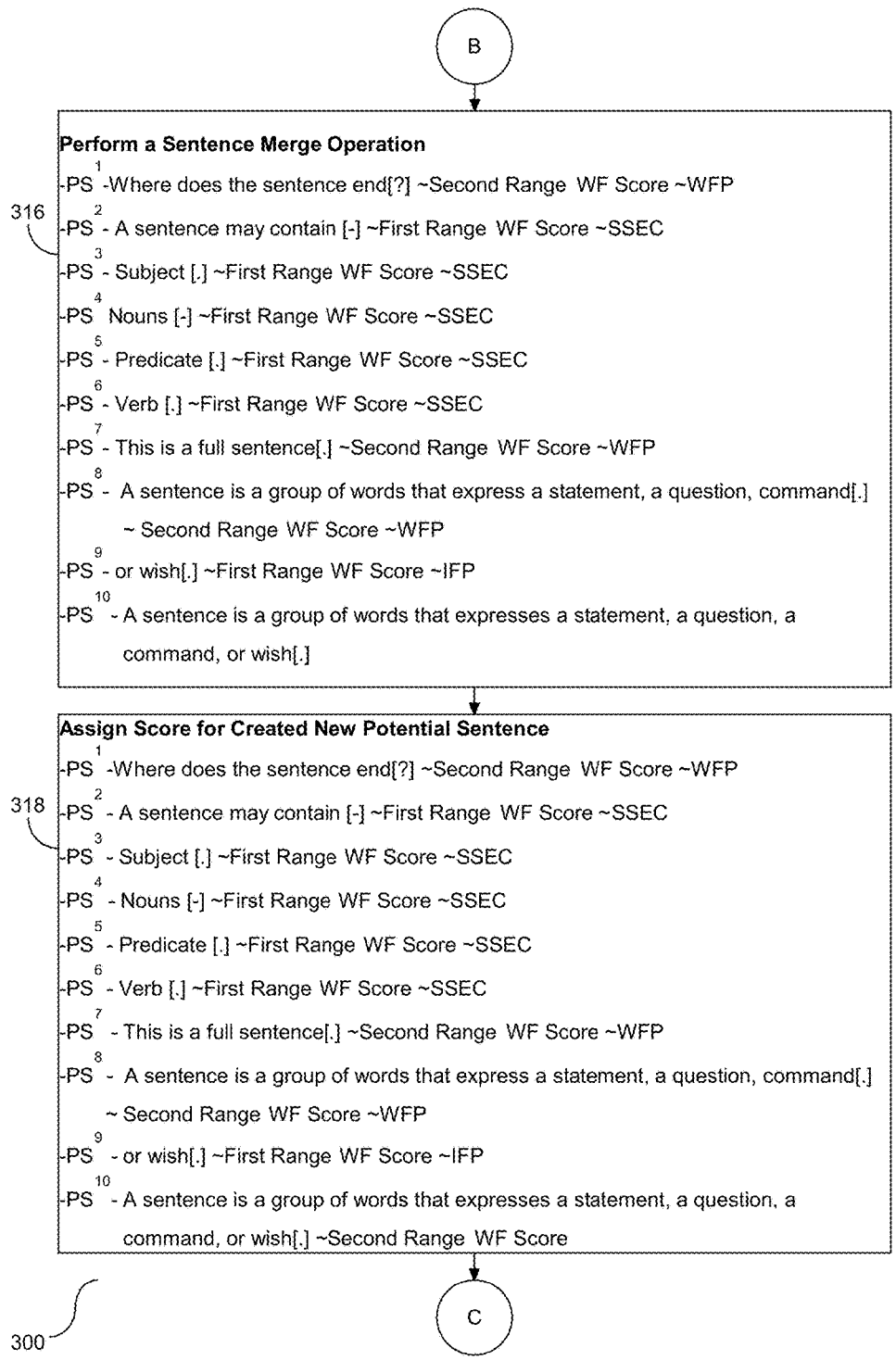
Figure 3D:
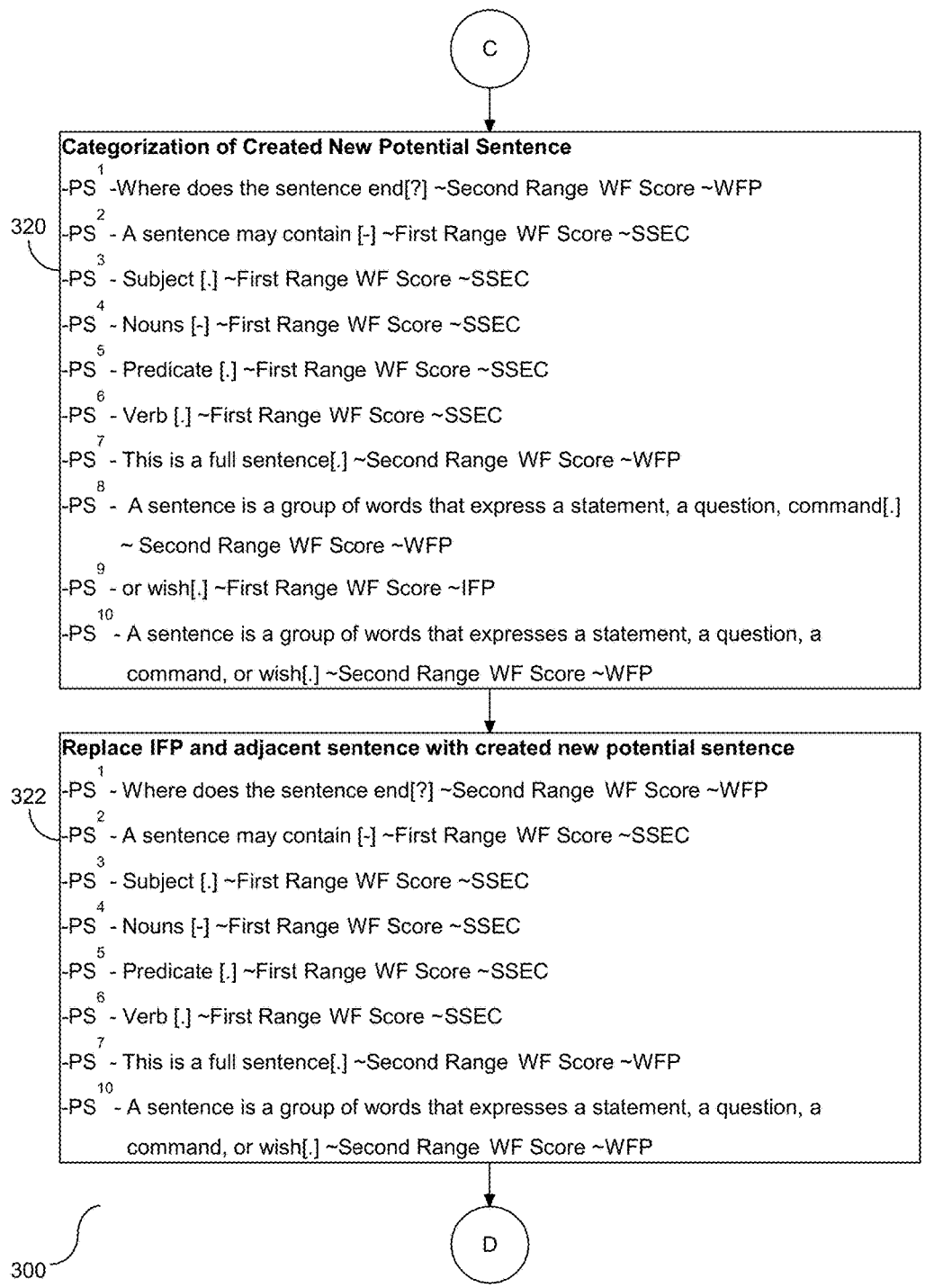
Figure 3E:
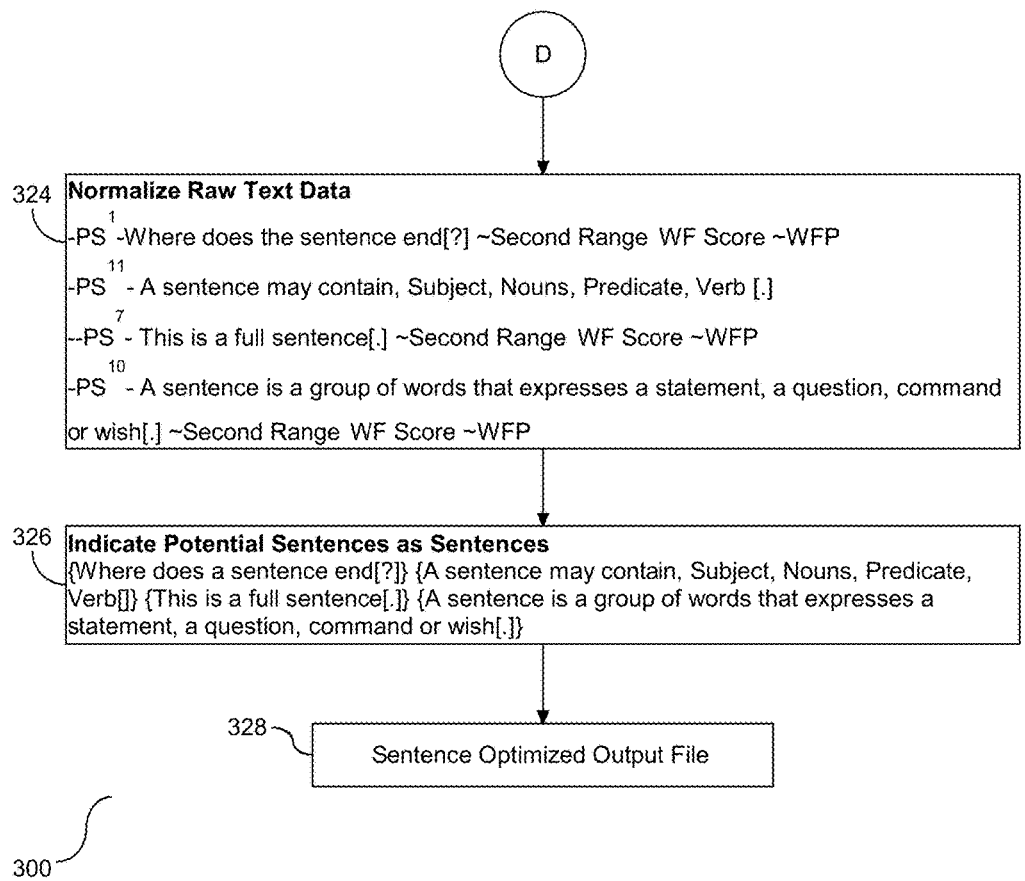

Aspects of the tools described above are used to support a method to process raw text data into sentence boundary optimized output. Referring to FIG. 2 a flow chart (200) is provided illustrating a method to determine optimal sentence boundaries. As shown, at step (202) raw text data is extracted from a document. The document is a file that is configured in a format. Examples of such formats include, but are not limited to, pdf, image, such as JPG or TIFF, word processing format, HTML file, or other document types. The raw text data may be extracted by a variety of extractors known by one skilled in the art. In one embodiment, visual recognition technology such as the Watson Recognition service can be employed to reconstruct binary image into a potential sentence via a combination of meta-data returned from such as service. At step (204) the raw text data is received for optimal sentence boundary placement. The raw text data may be in, but is not limited to, ASCII and/or Unicode. In one embodiment, the raw text data includes letters, numbers, and/or punctuation character marks. The received raw text data is cleaned (206). The cleaning includes language identification, character encoding detection, and special character spill detection. Accordingly, raw text data is prepared for optimal sentence boundary detection.

The raw text data is inspected and the preliminary sentence boundaries are identified from the inspection and in one embodiment, indicated (208). In on embodiment, the sentence boundaries are determined based on one or more rules. For example, the rules may identify or define a character or data which denotes a sentence conclusion or introduction. In one embodiment, preliminary sentence boundaries include sentence punctuation such as, but not limited to, ".", ",", "?", "!", ";", ":", "¡", and "¿". In one embodiment, the raw text data is modified to indicate the preliminary sentence boundaries. Using the preliminary sentence boundaries, potential sentences are determined and in one embodiment, indicated (210). The potential sentences are data (text) between two preliminary sentence boundaries. Accordingly, the raw text data is modified to indicate potential preliminary sentence boundary placement, and thereby identify potential sentences within the raw text data based on the preliminary sentence boundary placement.

Each determined potential sentence is inspected and assigned a well-formedness (WF) score (212). Each WF score has a specified value, with the value reflecting ill-formed and well-formed sentences. For example, in one embodiment, the score value within a first range of score values is indicative of a truncated or ill-formed sentence and the score value within a second range of score values is indicative that the potential sentence is a well-formed sentence. It is understood that a well-formed sentence as extracted from the raw text data would be understood or interpreted accurately by downstream NLP. The assignment utilizes a set of rules which include a plurality of methods which may be used to calculate the WF score. In one embodiment, a parser is used to determine a confidence score and the confidence score is used to generate the WF score that will be assigned to the potential sentence. Similarly, a confidence score may be determined from the perplexity of the part of speech, word, lemma, and character sequence as compared to a language model. Similarly, the confidence score may be determined from the edit distance, Levenshtein distance, Jaro Winkler distance, may be measured between the part of speech, word, lemma, and character sequence of the potential sentence and the part of speech, word, lemma, and character sequence of a well-formed sentence. In one embodiment, the rule is a non-parse rule. Accordingly, each potential sentence is assigned a WF score based on the probability of the sentence being a well-formed sentence.

Potential sentences with a WF score in a second range of score values are identified (214) and in one embodiment, categorized as well-formed prose (WFP). The score range values may be stored as a parameter and be user configurable, tunable, or preset. Potential sentences with a WF score in the first range of score values are identified (216), hereinafter referred to as deficient sentences. Each deficient sentence is categorized as either ill-formed-prose (IFP) or semi-structured entity constructs (SSEC) (218). In one embodiment, the definition of the category and the procedure to assign the category to a potential sentence is stored in rules. In one embodiment, another custom category is defined by the user. In one embodiment, the categorization step includes initially classifying deficient sentences as IFP(s) and marking consecutive IFPs as a group. The quantity of consecutive IFPs in the marked group is determined and if the quantity is above a sentence threshold all member IFPs in the group are re-classified as SSECs. In one embodiment, the categorization includes modifying the raw text data to categorized raw text data by changing the content of the data. Accordingly, each potential sentence is assigned to a category utilizing the assigned WF score.

In one embodiment, the categorization step includes a multi-class categorizer. The multi-class categorizer is trained by providing example sentence belonging to each category to the multi-class categorizer. In one embodiment, examples of a WFP, IFP, and SSEC are provided to the multi-class categorizer. The multi-class categorizer compares the potential sentence to at least one sentence from a first category and at least one sentence from a second category and categorizes the potential sentence based on the comparison. Accordingly, a multi-class categorizer can categorize potential sentences based on learned knowledge.

In one embodiment, the sentence is assigned to multiple categories. Multiple categories are used when the sentence has either multiple matches (e.g. a quantity within a predetermined distance of the sentence threshold), or no strong match based on a comparison (e.g. based on the multi-class categorizer). Multiple categories allow the potential sentence to be subject to the processing that each category of potential sentences undergoes. In one embodiment, a fourth category may be assigned which passes the sentence through unchanged or flags the sentence for human attention. Accordingly, each category assigned dictates which actions will be performed on the potential sentence.

A determination is made if there are IFPs subject to further processing (220). If the answer to the determination at step (220) is positive, the IFPs undergo a merge-sentence loop beginning with merge-sentence operation (222). The merge-sentence operation includes merging at least one IFP with at least one adjacent potential sentence to create a new potential sentence. The adjacent potential sentence may be any potential sentence identified at step (210) regardless of the assigned category. The merging includes removing at least one preliminary sentence boundary between the IFP and at least one adjacent potential sentence. The removal of the sentence boundary thereby combines the content of the potential sentences to create a new potential sentence. The new potential sentence is created to increase the WF score of the original IFP. Accordingly, a new potential sentence is created from an IFP and an adjacent potential sentence in order to make the IFP a part of a potential sentence with an increased WF score.

The process returns to step (212) to assign a WF score to the new created potential sentence. The created new potential sentence is then determined to be in the second range of score values (214) or in the first range of score values (216). If the created new potential sentence is in the first range of score values, the created new potential sentence is categorized (218). In one embodiment, the created new potential sentence is not categorized at step (218) if it is assigned a WF score in the first range of score values, and the process proceeds directly to (220). At step (220), if the created new potential sentence is in the second range of score values, the created new potential sentence replaces the IFP and any adjacent sentences utilized. In one embodiment, if the assigned WF score is not in the second range of score values, the new created potential sentence is unmerged and then a merge-sentence operation is performed with a different combination of adjacent sentence(s). Accordingly, the created new potential sentence is assigned a score, categorized and subject to further analysis.

The process of creating new potential sentences form an IFP(s) continues iteratively until the IFP(s) is no longer subject to further processing. An IFP is no longer subject to further processing if the created new potential sentence is assigned a WF score in the second range of score values. In one embodiment, the assigned WF score of each iteration of the created new potential sentence is stored in memory. In one embodiment, the IFP is not subject to further processing when a threshold amount of merge-sentence operations are performed and the iteration having a created new potential sentence with the highest WF score is chosen as the replacement for the IFP, e.g. the created new potential sentence to replace the IFP and any adjacent potential sentences used in the iteration. If the determination at step (220) is negative, and there are no IFPs, or the IFPs are not subject to further processing, the process proceeds to step (224). Accordingly, IFPs are merged with adjacent sentences until a WF score in the second range of score values is assigned to the created new potential sentence or a threshold number of iterations are performed and the iteration with the highest WF score is chosen as the replacement for the IFP.

As shown, at step (224), if any potential sentence is a SSEC a configurable normalization is performed on the potential sentence based on the assigned WF score and in one embodiment, the assigned category. The normalization process converts the SSEC(s) into a format that is easier to interpret by a downstream parser or a part of speech tagger than the unmodified raw text data. In one embodiment, normalization is applied to groups of SSECs. In one embodiment, the normalization separates the identified potential sentences within the potential sentence block with grammatical element, such as, but not limited to, commas, tabs semi-colons, colons, etc. In one embodiment, the normalization is user configurable. In one embodiment, normalized SSECs displays addresses on a single line with commas separating components. In one embodiment, normalized SSECs displays tables in comma separated values or tab separated values. Accordingly, SSECs are formatted for easier downstream NLP operations.

Following step (224) the raw text data is transformed into a sentence boundary optimized data output (226). In one embodiment, the raw text data is discarded and only the sentence boundary optimized output is maintained. The sentence boundary optimized output can be used in part of speech tagging, and parsing. Part of speech tagging and parsing are dependent on sentence boundaries. Other NLP processes such as entity extraction, relation extraction, co-reference, and semantic role labeling are dependent on part of speech tagging and parsing. In one embodiment, the sentence boundary optimized output is a file stored in memory. Thus, the sentence boundary optimized output increases the efficiency of downstream processing of raw text data.

Aspects of the tools described above are used to support extraction of raw text data from a document, process the raw text data, and output a sentence boundary optimized output. Referring to FIGS. 3A-E, a flow chart (300) is provided illustrating the creation of a sentence boundary optimized output. As shown, a document (302) is provided to the system. The system extracts information from the document in the form of raw text data (304). The raw text data (304) is inspected for preliminary sentence boundaries. The preliminary sentence boundaries are identified. In one embodiment, the preliminary sentence boundaries identified in raw text data (304) are instances of "?", "-", ".", "-", ".", ".", ".", ".", and ".". The preliminary sentence boundaries are indicated thereby transforming raw text data (304) into raw text data (306). The indication of preliminary sentences boundaries by "[ ]" in the figures is for illustration and should not be considered limiting. Accordingly, raw text data is extracted from the document and the preliminary sentence boundaries are indicated.

Based on the preliminary sentence boundaries, potential sentences are identified transforming raw text data (306) into raw text data (308). The potential sentences are indicated in FIG. 3A-E by "$PS^1$"-"$PS^{10}$" respectively. $PS^1$ is "Where does a sentence end" bounded by the beginning of the raw text data and preliminary sentence boundary "?". $PS^2$ is "A sentence may contain" bounded by the preliminary sentence boundary "?" and "-". $PS^3$ is "Subject" bound by "-" and ".". $PS^4$ is "Nouns" bounded by "." and "-". $PS^5$ is "Predicate" bounded by "-" and ".". $PS^6$ is "Verb" bounded by "." and ".". $PS^7$ is "This is a full sentence" bounded by "." and ".". $PS^8$ is "A sentence is a group of words that expresses a statement, a question, a command" bounded by "." and ".". $PS^9$ is "or wish" bounded by "." and ".". The indication of potential sentences as illustrated in FIG. 3A-E should not be considered limiting. Accordingly, potential sentences are indicated in the raw text data based on the preliminary sentence boundaries.

A WF score is assigned to each potential sentence "$PS^1$"-"$PS^{10}$" respectively thereby transforming raw text data (308) into scored raw text data (310). The assigned WF scores shown and described in FIG. 3A-E are for illustration purposes to demonstrate application of the embodiments, and as such should not be considered limiting. $PS^1$ is assigned a WF score in the second range of score values. $PS^2$ is assigned a WF score in the first range of score values. $PS^3$ is assigned a WF score in the first range of score values. $PS^4$ is assigned a WF score in the first range of score values. $PS^5$ is assigned a WF score in the first range of score values. $PS^6$ is assigned a WF score in the first range of score values. $PS^7$ is assigned a WF score in the second range of score values. $PS^8$ is assigned a WF score in the second range of score values. $PS^9$ is assigned a WF score in the first range of score values. Accordingly, WF scores are assigned to the potential sentences.

Each potential sentence in scored raw text data (310) is categorized based on the assigned WF score thereby transforming scored raw text data (310) into categorized raw text data (312). The categorization includes determining potential sentences assigned a WF score in the second range of score values and assigning them as well-formed prose (WFP). A low scoring potential sentence is initially categorized as ill-formed prose (IFP). The indication of the categories shown and described in FIG. 3A-E is for illustration purposes to demonstrate application of the embodiments, and as such should not be considered limiting. $PS^1$ is assigned to WFP. $PS^2$ is assigned to IFP. $PS^3$ is assigned to IFP. $PS^4$ is assigned to IFP. $PS^5$ is assigned to IFP. $PS^6$ is assigned to IFP. $PS^7$ is assigned to WFP. $PS^8$ is assigned to WFP. $PS^9$ is assigned to IFP. Consecutive potential sentences assigned as IFP are marked as a group (312). The indication of the group (312a) in FIG. 3A-E represented by the dashed box should not be considered limiting. The group (312a) consists of consecutive potential sentences, $PS^2$, $PS^3$, $PS^4$, $PS^5$, and $PS^6$. Accordingly, the WF score is assigned and used to categorize the potential sentences.

The group (312a) in categorized raw text data (312) is inspected according to a rule and determined to have a quantity of members over a sentence threshold. All members in the group (312a) are re-categorized as semi-structured entity constructs (SSECs) transforming categorized raw text data (312) into re-categorized raw text data (314). $PS^2$ is assigned to SSEC. $PS^3$ is assigned to SSEC. $PS^4$ is assigned to SSEC. $PS^5$ is assigned to SSEC. $PS^6$ is assigned to SSEC. Accordingly, a group of consecutive IFPs over a threshold are re-categorized as SSECs.

Re-categorized raw text data (314) is inspected to determine if any potential sentences are classified as IFP. During the inspection, it is determined that $PS^9$ is categorized as an IFP. $PS^9$ undergoes a merge-sentence operation wherein the sentence boundary "." is removed from between $PS^8$ and $PS^9$. And a new potential sentence, $PS^{10}$, is created. The creation of $PS^{10}$ transforms re-categorized raw text data (314) into merged raw text data (316). $PS^{10}$ is "a sentence is a group of words that expresses a statement, a question, command or wish" bounded by "." and ".". In one embodiment, potential sentences $PS^8$ and $PS^9$ are maintained in the raw text data until the IFP merge-sentence operation creates a potential sentence with an assigned WF score in the second range of score values. Accordingly, the IFP, $PS^9$ is merged with adjacent potential sentence $PS^8$ to create potential sentence $PS^{10}$.

The created new potential sentence $PS^{10}$ is assigned a WF score transforming merged raw text data into scored merged raw text data (318). More specifically, $PS^{10}$ is assigned a WF score in the second range of score values. The created new potential sentence $PS^{10}$ is assigned a category transforming merged raw text data (318) into categorized merged raw text data (320). $PS^{10}$ is assigned to WFP. Categorized merged raw text data (320) is inspected to determine if the $PS^9$ has become a part of a potential sentence with an assigned WF score in the second range of score values. From the inspection, it is determined $PS^9$ is contained in $PS^{10}$ which has an assigned WF score in the second range of score values. Since $PS^{10}$ was assigned with a WF score in the second range of score values, $PS^{10}$ replaces potential sentences $PS^8$ and $PS^9$ transforming categorized merged raw text data (320) into modified raw text data (322). Accordingly, an IFP is identified and a sentence boundary proximal the IFP is modified to create a new potential sentence with a higher WF score.

The potential sentences assigned as SSECs are normalized transforming modified raw text data (322) into normalized raw text data (324). The normalization includes creating a new formatted potential sentence $PS^{11}$. $PS^{11}$ was created from $PS^2$-$PS^6$ by removing the preliminary sentence boundaries, "-" between $PS^2$ and $PS^3$, "." between $PS^3$ and $PS^4$, "-" between $PS^4$ and $PS^5$, and "." between $PS^5$ and $PS^6$. The formatted potential sentence is in a comma separated value format. More specifically commas were placed between $PS^2$ and $PS^3$, between $PS^3$ and $PS^4$, between $PS^4$ and $PS^5$, and between $PS^5$ and $PS^6$. The comma separated value format is used in the figures for illustration purposes and should not be considered limiting. The remaining preliminary sentence boundaries in raw text data (324) are the optimized sentence boundaries. Accordingly, the merging of IFPs and normalization of SSECs results in optimized sentence boundaries.

The remaining potential sentences are indicated to be sentences utilizing the optimized sentence boundaries thereby creating raw text data output (326). The indication of the sentences in the figures is shown by "{ }" for illustration purposes only and should not be considered limiting. The raw text data output (326) is utilized to create a sentence boundary optimized file (328). In one embodiment, the sentence optimized output file is stored in memory. The optimized sentence output file can be used by downstream NLP such as parsing and part of speech tagging which rely on sentence boundary placement. Accordingly, a raw text data can be extracted from a document and used to create a sentence optimized output file.

Aspects of sentence boundary optimization provided in FIGS. 1-3A-E, employ one or more functional tools to support use of sentence boundary optimization. Aspects of the functional tool, e.g. extractor, cleaner, sentence boundary detector, well-formedness scorer, categorizer, sentence-merger, and normalizer, and its associated functionality may be embodied in a computer system/server in a single location, or in one embodiment, may be configured in a cloud based system sharing computing resources. With references to FIG. 4, a block diagram (400) is provided illustrating an example of a computer system/server (402), hereinafter referred to as a host (402) in communication with a cloud based support system, to implement the processes described above with respect to FIGS. 1-3A-E. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
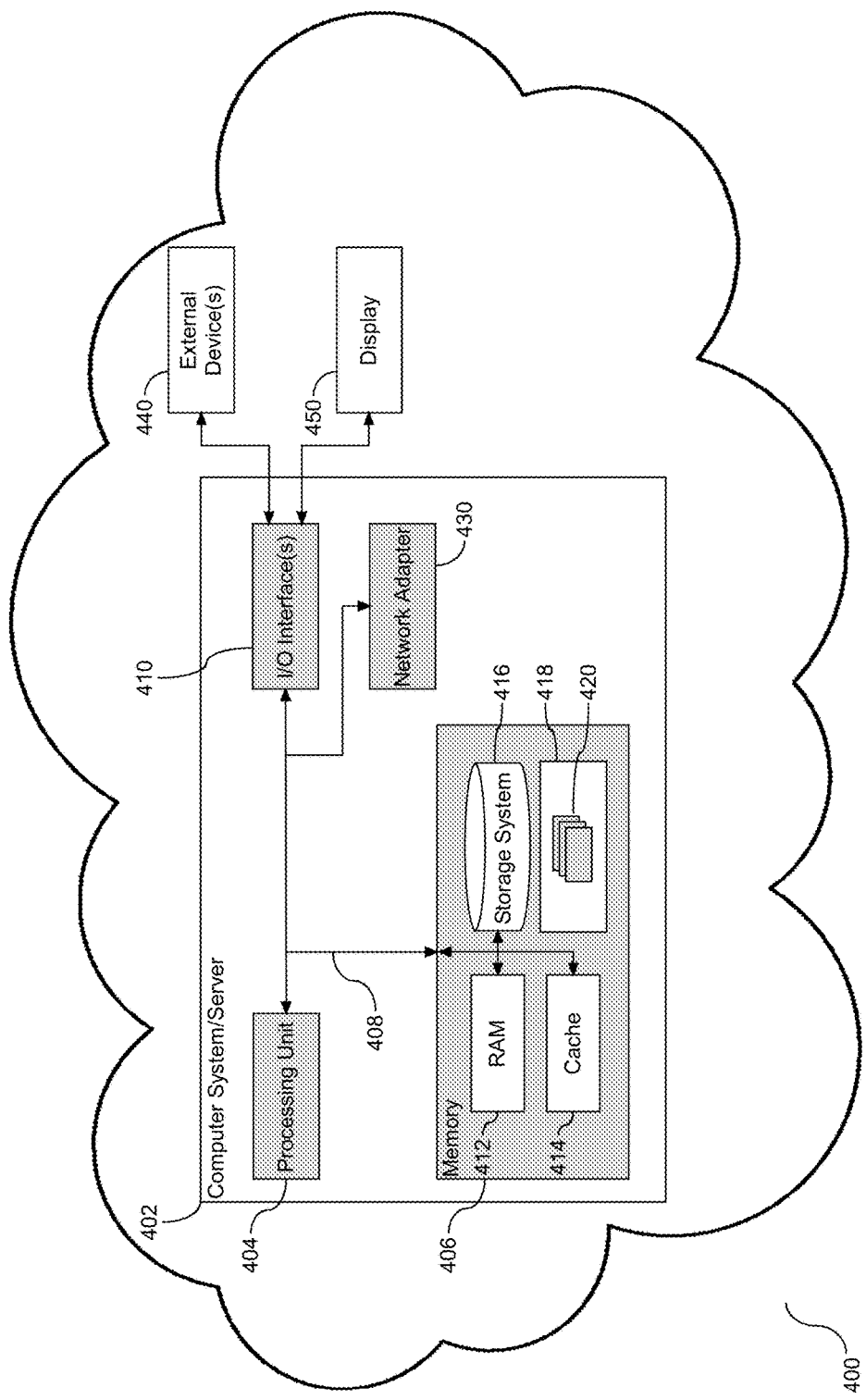
FIG. 4 is a block diagram illustrating an example of a computer system/server of a cloud based support system, to implement the process described above with respect to FIGS. 1-3A-E.

As shown in FIG. 4, host (402) is shown in the form of a general-purpose computing device. The components of host (402) may include, but are not limited to, one or more processors or processing units (404), a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (412) and/or cache memory (414). By way of example only, storage system (416) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (418), having a set (at least one) of program modules (420), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (420) generally carry out the functions and/or methodologies of embodiments to store and analyze data. For example, the set of program modules (420) may include the modules configured for sentence boundary optimization as described in FIGS. 1-3A-E.

Host (402) may also communicate with one or more external devices (440), such as a keyboard, a pointing device, etc.; a display (450); one or more devices that enable a user to interact with host (402); and/or any devices (e.g., network card, modem, etc.) that enable host (402) to communicate with one or more other computing devices. Such communication can occur via Input/Output (I/O) interface(s) (410). Still yet, host (402) can communicate with one or more networks such as a local area network (LAN), a general wide area network (WAN), and/or a public network (e.g., the Internet) via network adapter (430). As depicted, network adapter (430) communicates with the other components of host (402) via bus (408). In one embodiment, a plurality of nodes of a distributed file system (not shown) is in communication with the host (402) via the I/O interface (410) or via the network adapter (430). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (412), cache (414), and storage system (416), such as a removable storage drive and a hard disk installed in a hard disk drive.

Computer programs (also called computer control logic) are stored in memory (406). Computer programs may also be received via a communication interface, such as network adapter (430). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
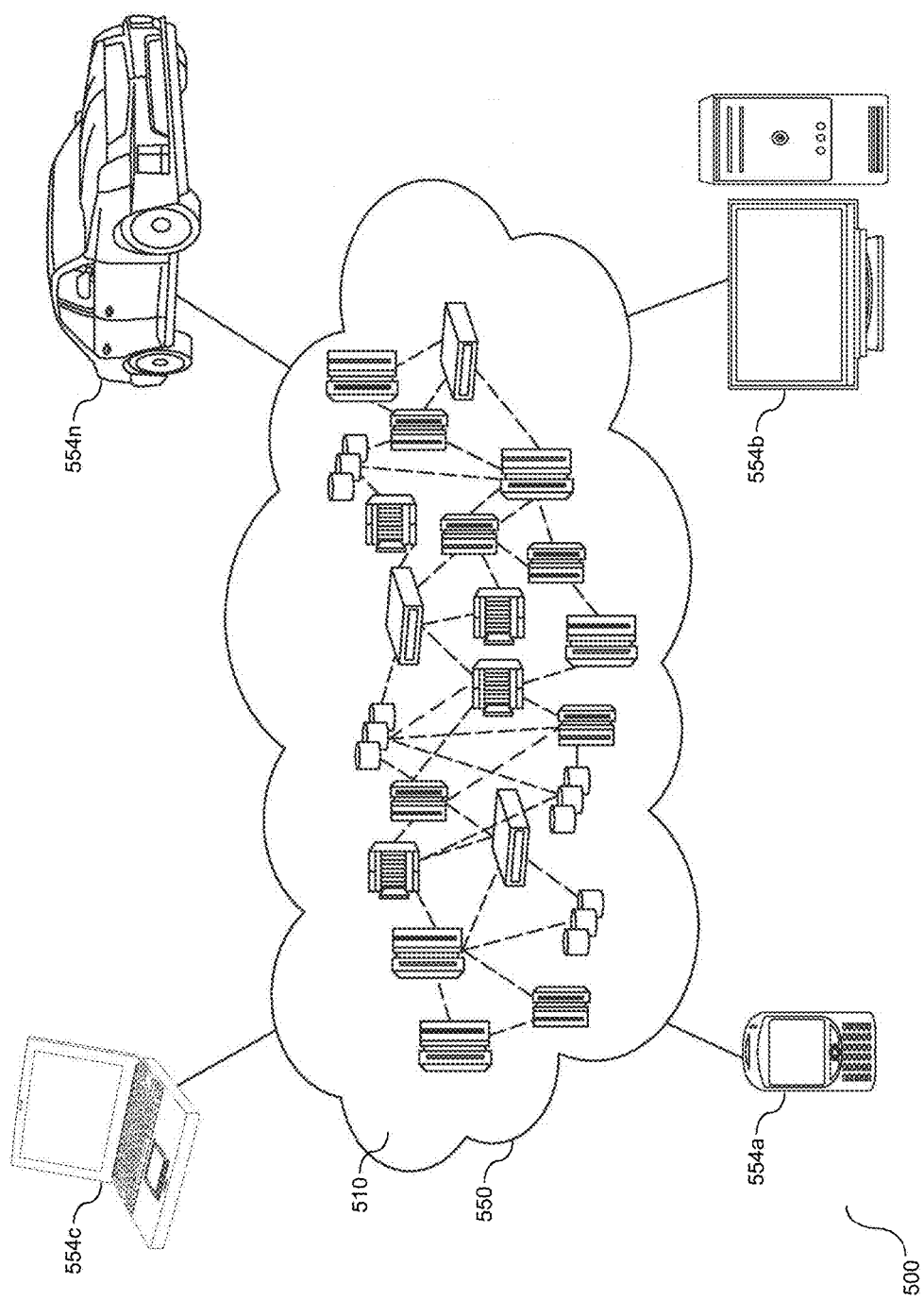
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 4 are intended to be illustrative only and that the cloud computing environment (550) can communicate with any type of computerized device over any type of network and/or network addressable connection (e.g., using a web browser).

Figure 6:
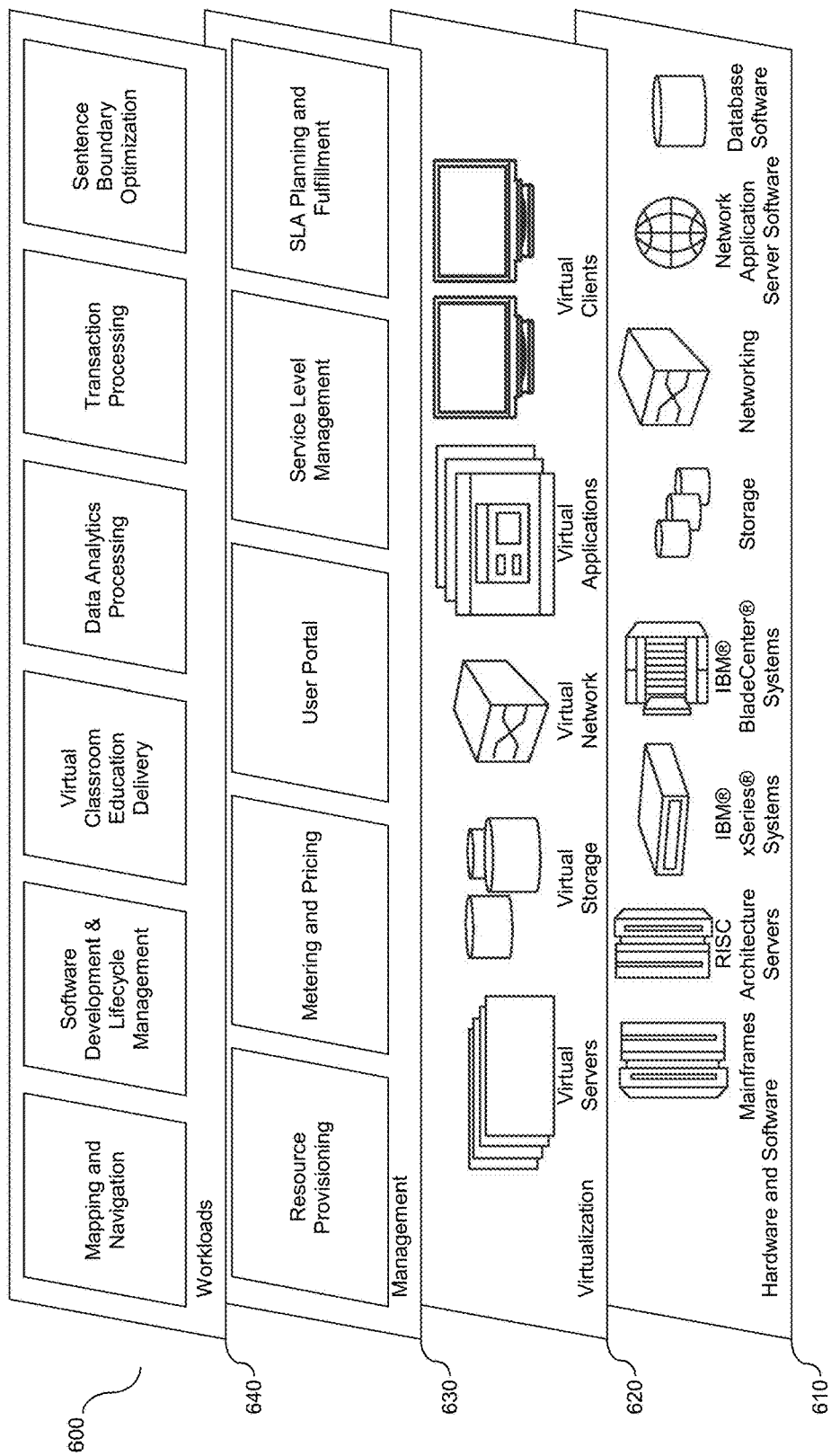
FIG. 6 depicts a block diagram illustrating a set of functional abstraction model layers provided by the cloud computing environment.

Referring now to FIG. 6, a set of functional abstraction layers provided by the cloud computing network of FIG. 4 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640). The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and sentence boundary optimization.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of sentence boundary optimization the increasing downstream processing efficiency.

It will be appreciated that, although specific embodiments have been described herein for purposes of illustration, various modifications may be made without departing from the spirit and scope of the embodiments. In particular, the raw text data can be extracted from an audio file or other source. Accordingly, the scope of protection of these embodiments is limited only by the following claims and their equivalents.

What is claimed is:

1. A computer system comprising:
a processor in communication with a memory; and
one or more tools for natural language processing, the tools operatively coupled to the processor, the tools to:
determine optimal sentence boundary placement with a received string input comprising:
identify two or more preliminary sentence boundaries within the input;
identify two or more potential sentences within the input utilizing the two or more preliminary sentence boundaries;
assign a first score to each identified potential sentence wherein each assigned first score corresponds to a probability of the two or more potential sentences being an actual sentence;
selectively compare each identified potential sentence based on a relationship to the assigned first score to a first potential sentence in a first category and a second potential sentence in a second category;
selectively categorize each compared potential sentence based on the comparison into one of the first and second categories; and
transform the input into a sentence optimized output including modification of at least one potential sentence utilizing the input, categorization, and at least one of the two or more preliminary sentence boundaries, the transformation including:
create a new potential sentence utilizing the at least one potential sentence and movement of the at least one preliminary sentence boundary;
assign a second score to the created new potential sentence;
determine the assigned second score of the created new potential sentence is greater than the assigned first score of the at least one potential sentence utilized to create the created new potential sentence; and
replace the at least one potential sentence utilized to create the created new potential sentence with the created new potential sentence.

2. The system of claim 1, wherein the categorization includes a third category corresponding to any potential sentence having a specified similarity to at least one of the first potential sentence and the second potential sentence.

3. The system of claim 1, wherein the transformation of a potential sentence assigned to the second category includes formatting the potential sentence assigned to the second category utilizing a formatting option selected from the group consisting of: convert a table to a comma separated value file, convert a table to a tab separated value file, convert a figure to a text description of the figure, convert a binary image to a potential sentence, convert a list into a single line with a comma separating any value.

4. The system of claim 1, wherein the transformation of a sentence assigned to the first category includes the tools to merge the sentence assigned to the first category with an adjacent potential sentence.

5. A computer program product for natural language processing, the computer program product comprising a computer readable storage medium having program code embodied therewith, the program code executable by a processor to:
determine optimal sentence boundary placement with a received string input comprising:
identify two or more preliminary sentence boundaries within the input;
identify two or more potential sentences within the input utilizing the two or more preliminary sentence boundaries;
assign a first score to each identified potential sentence wherein each assigned first score corresponds to a probability of the two or more potential sentences being an actual sentence;
selectively compare each identified potential sentence based on a relationship to the assigned first score to a first potential sentence in a first category and a second potential sentence in a second category;
selectively categorize each compared potential sentence based on the comparison into one of the first and second categories; and
transform the input into a sentence optimized output including modification of at least one potential sentence utilizing the input, categorization, and at least one of the two or more preliminary sentence boundaries, the transformation including:
create a new potential sentence utilizing the at least one potential sentence and movement of the at least one preliminary sentence boundary;
assign a second score to the created new potential sentence;
determine the assigned second score of the created new potential sentence is greater than the assigned first score of the at least one potential sentence utilized to create the created new potential sentence; and
replace the at least one potential sentence utilized to create the created new potential sentence with the created new potential sentence.

6. The computer program product of claim 5, wherein the categorization includes a third category corresponding to any potential sentence having a specified similarity to at least one of the first potential sentence and the second potential sentence.

7. The computer program product of claim 5, wherein the transformation of a potential sentence assigned to the second category includes formatting the potential sentence assigned to the second category utilizing a formatting option selected from the group consisting of: convert a table to a comma separated value file, convert a table to a tab separated value file, convert a figure to a text description of the figure, convert a binary image to a potential sentence, convert a list into a single line with a comma separating any value.

8. The computer program product of claim 5, wherein the transformation of a sentence assigned to the first category includes program code to merge the sentence assigned to the first category with an adjacent potential sentence.

9. A method for natural language processing comprising:
determining optimal sentence boundary placement within a received string input comprising;
identifying two or more preliminary sentence boundaries within the input;
identifying two or more potential sentences within the input utilizing the two or more preliminary sentence boundaries;
assigning a first score to each identified potential sentence wherein each assigned first score corresponds to a probability of the two or more potential sentence being an actual sentence;
selectively comparing each identified potential sentences based on a relationship to the assigned first score to a first potential sentence in a first category and a second potential sentence in a second category;
selectively categorizing each compared potential sentence based on the comparison into one of the first and second categories; and
transforming the input into a sentence optimized output including:
modifying at least one potential sentence utilizing the input, categorization, and at least one of the two or more preliminary sentence boundaries;
creating a new potential sentence utilizing the at least one potential sentence and movement of at least one preliminary sentence boundary;
assigning a second score to the created new potential sentence;
determining the assigned second score of the created new potential sentence is greater than the assigned first score of the at least one potential sentence utilized to create the created new potential sentence; and
replacing the at least one potential sentence utilized to create the created new potential sentence with the created new potential sentence.

10. The method of claim 9, wherein the categorizing further comprising a third category corresponding to any potential sentence having a specified similarity to at least one of the first potential sentence and the second potential sentence.

11. The method of claim 9, wherein the transforming of a potential sentence assigned to the second category includes formatting the potential sentence assigned to the second category utilizing a formatting option selected from the group consisting of: converting a table to a comma separated value file, converting a table to a tab separated value file, converting a figure to a text description of the figure, converting a binary image to a potential sentence, converting a list into a single line with a comma separating any value.

12. The method of claim 9, wherein the transforming of a sentence assigned to the first category includes merging the sentence assigned to the first category with an adjacent potential sentence.

* * * * *